(12) United States Patent
O'Dowd et al.

(10) Patent No.: US 8,640,868 B2
(45) Date of Patent: Feb. 4, 2014

(54) CASE ASSEMBLY AND METHOD FOR COVERING AND PROTECTING A PORTABLE DEVICE

(76) Inventors: John O'Dowd, Cappamore (IE); Canay Tulunay Riordan, San Francisco, CA (US)

( * ) Notice: Subject to any disclaimer, the term of this patent is extended or adjusted under 35 U.S.C. 154(b) by 0 days.

(21) Appl. No.: 13/350,587

(22) Filed: Jan. 13, 2012

(65) Prior Publication Data

US 2013/0180879 A1  Jul. 18, 2013

(51) Int. Cl.
*B65D 85/00* (2006.01)
*H05K 5/00* (2006.01)
*G06F 1/16* (2006.01)
*H04M 1/00* (2006.01)

(52) U.S. Cl.
USPC ............... 206/320; 361/679.56; 455/575.8

(58) Field of Classification Search
USPC ............... 206/305, 320; 361/679.02, 679.55, 361/679.56, 679.41; 455/575.1–575.8
See application file for complete search history.

(56) References Cited

U.S. PATENT DOCUMENTS

| | | | |
|---|---|---|---|
| 6,536,589 B2 * | 3/2003 | Chang | 206/320 |
| 7,428,427 B2 * | 9/2008 | Brunstrom et al. | 455/575.8 |
| 7,612,997 B1 * | 11/2009 | Diebel et al. | 361/679.56 |
| 7,889,498 B2 * | 2/2011 | Diebel et al. | 361/679.56 |
| 8,051,980 B2 * | 11/2011 | Tai et al. | 206/320 |
| 8,167,127 B2 * | 5/2012 | Martin et al. | 206/320 |
| 8,286,789 B2 * | 10/2012 | Wilson et al. | 206/320 |
| 8,295,043 B2 * | 10/2012 | Tai et al. | 361/679.56 |
| 8,509,864 B1 * | 8/2013 | Diebel | 455/575.8 |
| 2011/0233078 A1 * | 9/2011 | Monaco et al. | 206/223 |
| 2012/0309475 A1 * | 12/2012 | Johnson | 455/575.8 |
| 2013/0023313 A1 * | 1/2013 | Kim | 455/575.8 |
| 2013/0168274 A1 * | 7/2013 | Chen | 206/320 |

* cited by examiner

*Primary Examiner* — Bryon Gehman
(74) *Attorney, Agent, or Firm* — Husch Blackwell LLP; Glenn H. Lenzen

(57) ABSTRACT

A case assembly for a portable device is provided that has a first sleeve member, a second sleeve member and a customized plate member. The first sleeve member is mated with the second sleeve member to encase the portable device. The customized plate member is configured and arranged to connect with the first sleeve member and the second sleeve member.

12 Claims, 9 Drawing Sheets

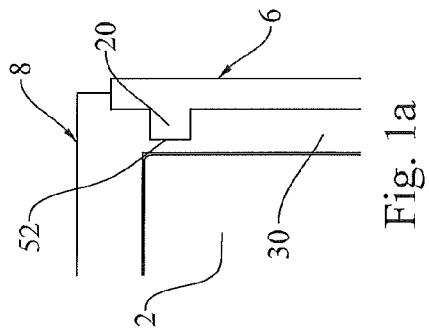
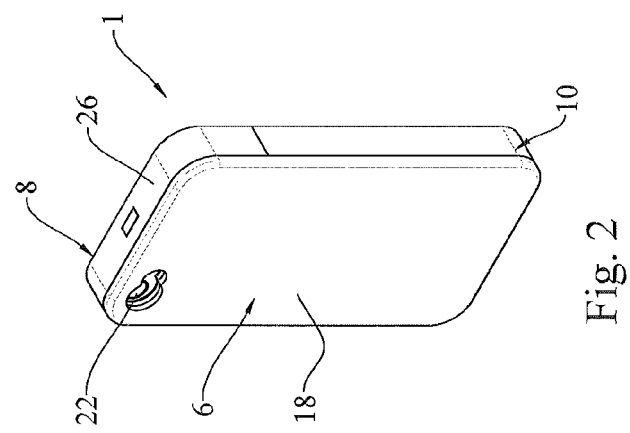
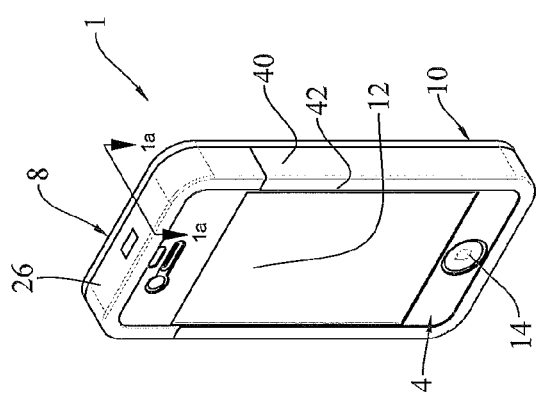

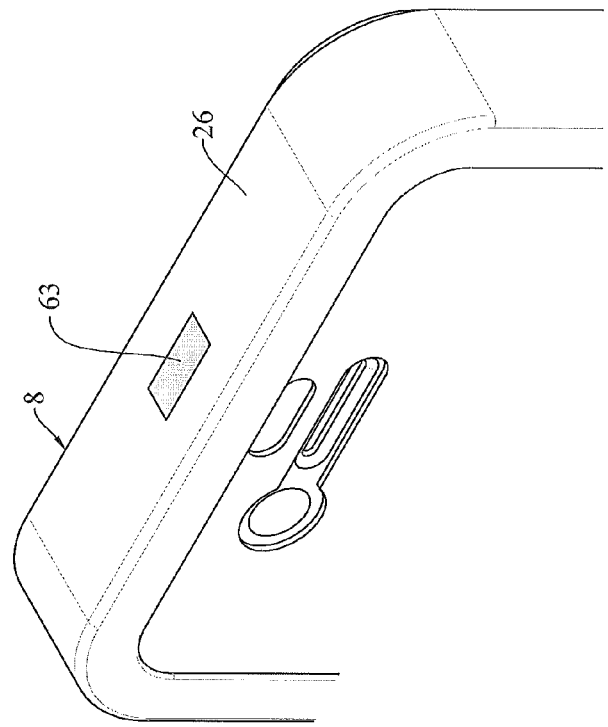
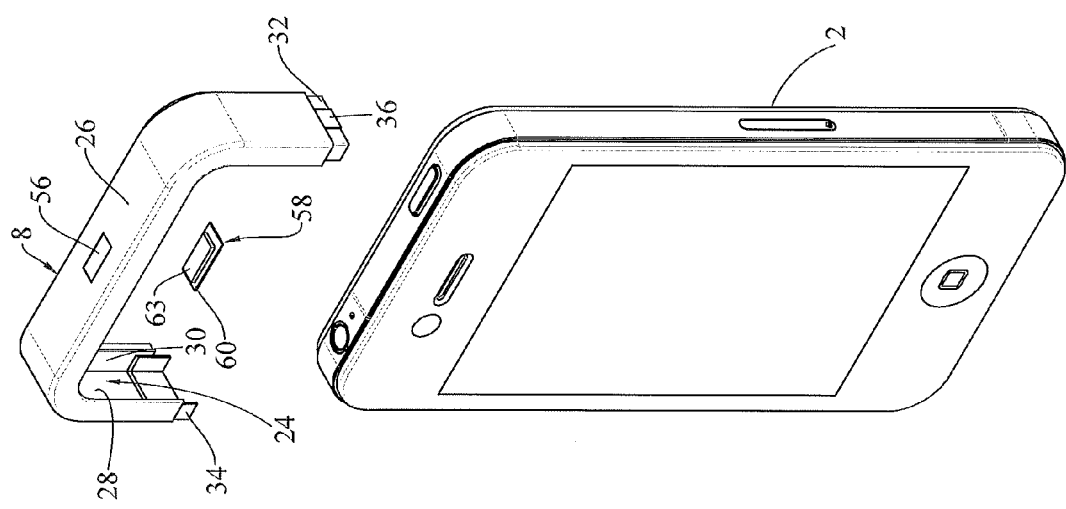
Fig. 7
Fig. 6

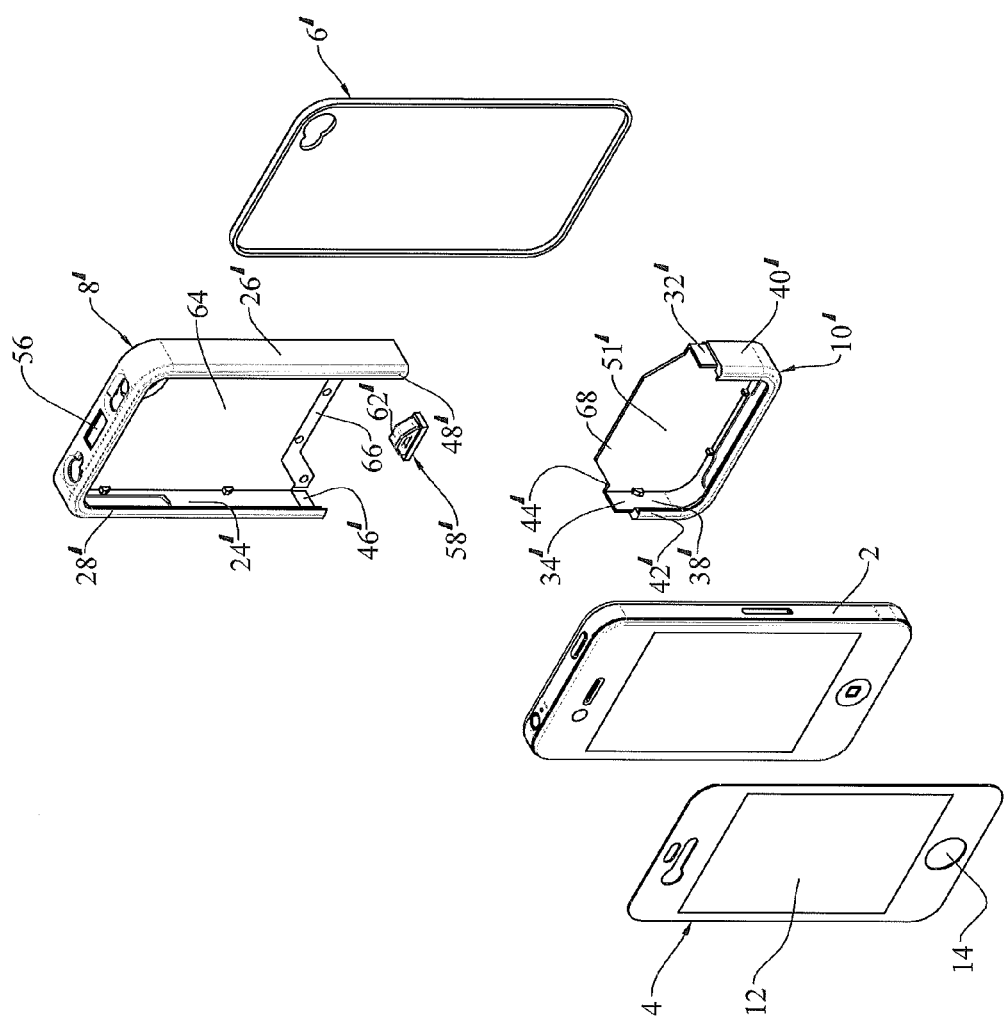

Section B-B

Section A-A

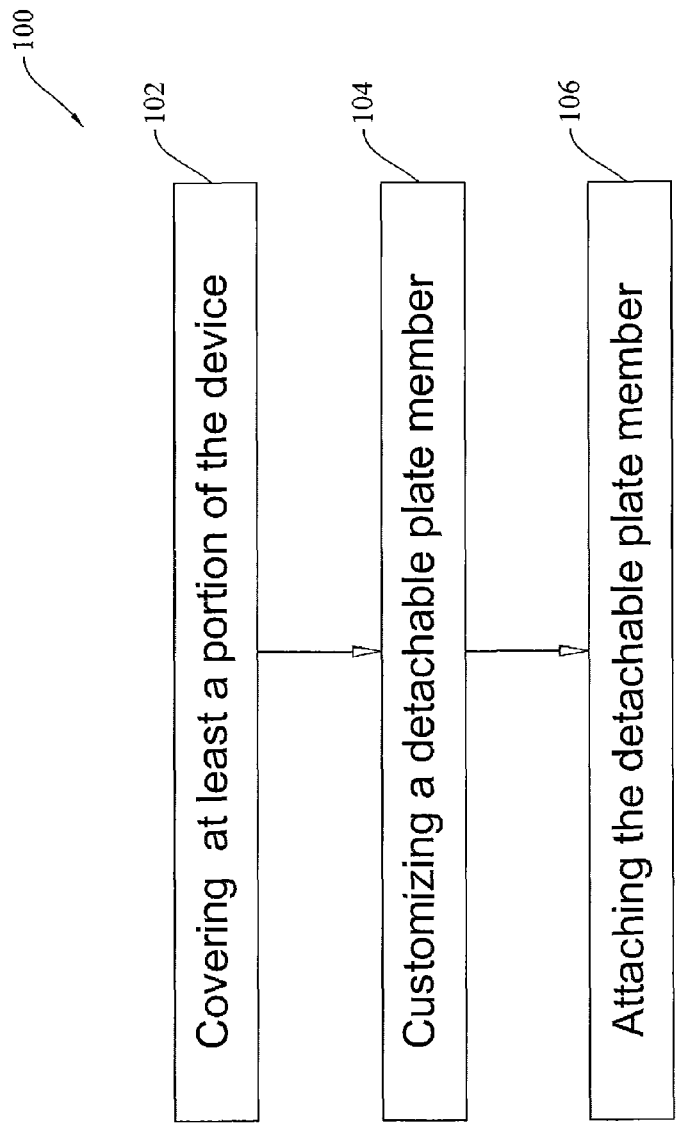

US 8,640,868 B2

CASE ASSEMBLY AND METHOD FOR COVERING AND PROTECTING A PORTABLE DEVICE

BACKGROUND OF THE INVENTION

1. Field of the Invention

The present invention generally relates to a case assembly. More specifically, the present invention relates to a case assembly for protecting a portable device.

2. Background Information

Protective covers often encase portable devices such as an iPhone, iPod, or iPad, Blackberry. These protective covers are made to be relatively permanent and remain fixed onto the portable device for the life of the protective cover. Thus, if after a period of use the user grows tired of the cover's appearance, an entirely new protective cover must be obtained to encase the portable device.

SUMMARY OF THE INVENTION

A case assembly for a portable device is provided that basically comprises a first plate member, a second plate member, a first sleeve member and a second sleeve member. The second plate member has an interior surface, a ridge portion extending from the interior surface and graphics to individualize the portable device. The ridge portion is disposed about a periphery of the interior surface of the second plate member. The first sleeve member includes a first receptacle channel having insert portions extending therefrom. The first sleeve member is sized and configured to fit over the portable device and to curve about its perimeter. The second sleeve member has sheath portions configured to receive the insert portions. The second sleeve member is sized and configured to fit over the portable device and to curve about its perimeter. The second plate member is disposed adjacent the second sleeve member.

A method is provided that basically comprises covering at least a portion of a portable device with a first sleeve member and with a second sleeve member; customizing a detachable plate member with graphics; and attaching the detachable plate member to the first and second sleeve members.

A case assembly for a portable device is provided that basically comprises a first sleeve member, a second sleeve member and a customized plate member. The first sleeve member is mated with the second sleeve member to encase the portable device. The customized plate member is configured and arranged to connect with the first sleeve member and the second sleeve member.

A case assembly is also provided that basically comprises a first sleeve member, a second sleeve member and an accessory member. The second sleeve member is mated with the first sleeve member to encase a portable device. The accessory member is disposed at the first sleeve member and extends into an accessory aperture of the first sleeve member. The accessory member is trapped by the first sleeve member.

BRIEF DESCRIPTION OF THE DRAWINGS

Referring now to the attached drawings which form a part of this original disclosure:

FIG. 1 is a front perspective view of a portable device with a case assembly in accordance with a first embodiment of the present invention;

FIG. 1a is a partial cross-section of the case assembly of FIG. 1 taken along line 1a-1a;

FIG. 2 is a rear perspective view of the case assembly in accordance with the first embodiment of the present invention;

FIG. 6 is an exploded view of a first sleeve member and another embodiment of an accessory member of the case assembly as they fit on the portable device;

FIG. 7 is a magnified front perspective view of the first sleeve member and the accessory member of FIG. 6 secured on the portable device;

FIG. 10 is an exploded front view of the case assembly in accordance with the second embodiment of the present invention;

FIG. 15 is a block diagram of a flowchart illustrating a method.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 3:
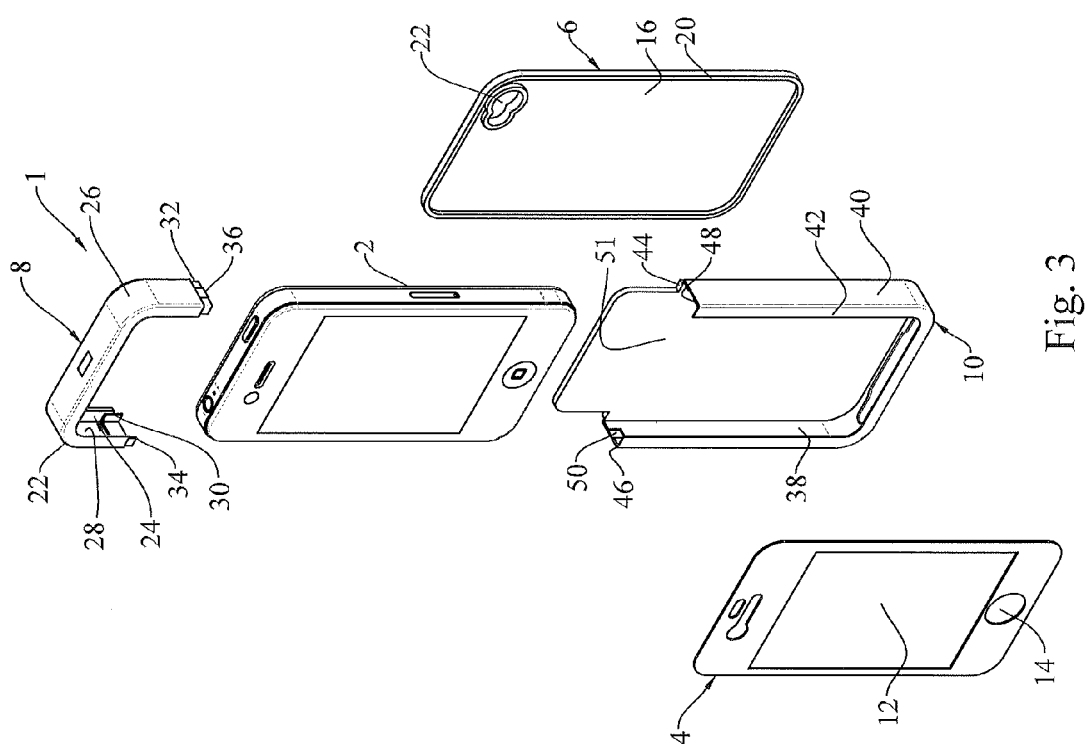
FIG. 3 is an exploded front view of the case assembly in accordance with the first embodiment of the present invention.

Referring initially to FIGS. 1-3, a case assembly 1 is illustrated in accordance with a first embodiment of the present invention. The case assembly 1 is configured to protect a portable device 2 and provides a detachable component to individualize the portable device 2. The portable device 2 may be an electronic device, such as a Smartphone, iPhone, iPod, iPad, Blackberry, etc. While the case assembly 1 is illustrated in the Figures as covering an iPhone, it will be apparent to one of ordinary skill in the art from this disclosure that the case assembly 1 may cover other portable devices 2 by sizing the casing assembly 1 appropriately and providing the necessary apertures for access to various components of the portable devices 2.

As best shown in FIG. 3, the case assembly 1 includes a first plate member 4, a customized second plate member 6, a first sleeve member 8 and a second sleeve member 10. The first plate member 4 is configured to abut a front of the portable device 2 while the second plate member 6 is configured to abut at least a portion of the first sleeve member 8 and the second sleeve member 10. The second plate member 6 is detachable from the first and second plate members 8, 10 for replacement of graphics on the second plate member 6. The first and second sleeve members 8, 10 are sized and configured to mate together, thereby encapsulating at least a portion of the portable device 2.

To accommodate a display and control component at the front of the portable device 2, the first plate member 4 includes a transparent film 12 (best shown in FIG. 3) and an aperture 14 (best shown in FIG. 3) for a user to reach the control component. Other apertures such as an aperture over a camera lens and an aperture over a speaker may be present in the first plate member 4. The transparent film 12 may be omitted in some embodiments and an aperture for placement over the display of the portable device 2 is utilized.

The first plate member 4 is generally made of polyethylene terephthalate, for example. The first plate member 4 is sized so that its outer perimeter fits within the first and second sleeve members 8, 10. That is, the first plate member 4 is generally of the same area and has generally the same perimeter or shape as the front of the portable device 2. Thus, the portable device 2 and the first plate member 4 fit within the protective first and second sleeve members 8, 10.

The second plate member 6 is generally made of acrylonitrile butadiene styrene, polycarbonate or poly-olefin resins, for example. The second plate member 6 includes an interior face 16 (best shown in FIG. 3), an exterior face 18 (best shown in FIG. 2) and a ridge portion 20 (best shown in FIG. 3). The interior face 16 abuts the first and second sleeve members 8, 10 when attached via the ridge portion 20. The ridge portion 20 is a raised, rib-like portion that protrudes from the interior face 16 and borders a periphery of the second plate member 6. The second plate member 6 may also include one or more apertures 22 (best shown in FIG. 3) for placement over components of the portable device 2.

The exterior face 18 of the second plate member 6 includes graphics to individualize the case assembly 1 as the user desires. As used herein, "graphics" is intended to mean one or more of artwork, photographs, patterns, colors, text and logos that are printed, molded, etched or adhered (e.g. a film) onto the exterior face 18 of the second plate member 6. Graphics may also include varying textures, thickness and material make-up by varying materials such as fabrics, leather, metal films and foils. A user of the case assembly 1 may order an additional second plate member 6 at a web-based merchant, for example, with custom designed graphics on the exterior face 18. The user may then replace the second plate member 6 with a new customized plate member 6 to change the appearance of the case assembly 1 without having to purchase an entirely new cover for the portable device 2.

Referring to FIGS. 1-7, the first sleeve member 8 is a generally rigid member that fits over a top portion of the portable device 2. The first sleeve member 8 will flex slightly according to its dimensions and material make-up. However, the first sleeve member 8 provides a rigid covering of the portable device 2. The first sleeve member 8 is generally made of acrylonitrile butadiene styrene, polycarbonate or poly-olefin resins, for example. As best shown in FIG. 3, the first sleeve member 8 includes a first receptacle channel 24 formed by a perimeter wall 26 and flange walls 28, 30. The perimeter wall 26 abuts against a perimeter of the portable device 2. The flange walls 28, 30 are disposed approximately perpendicular to the perimeter wall 26 and are located on respective sides of the perimeter wall 26. The perimeter wall 26 and the flange walls 28, 30 are shaped to substantially follow contours present in the perimeter of the portable device 2. As best shown in FIG. 3, the first sleeve member 8 has insert portions 32, 34 at respective end portions of the receptacle channel 24. In this embodiment, the insert portions 32, 34 have optional ribs 36 protruding therefrom.

Figure 4:
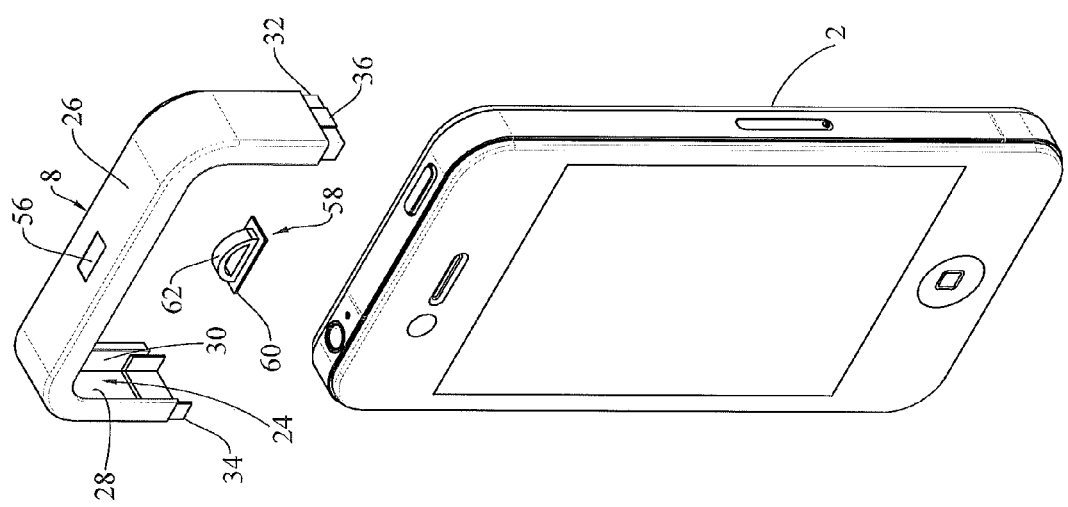
FIG. 4 is an exploded view of a first sleeve member of FIG. 1 and an accessory member of the case assembly as they fit on the portable device.
Figure 9:
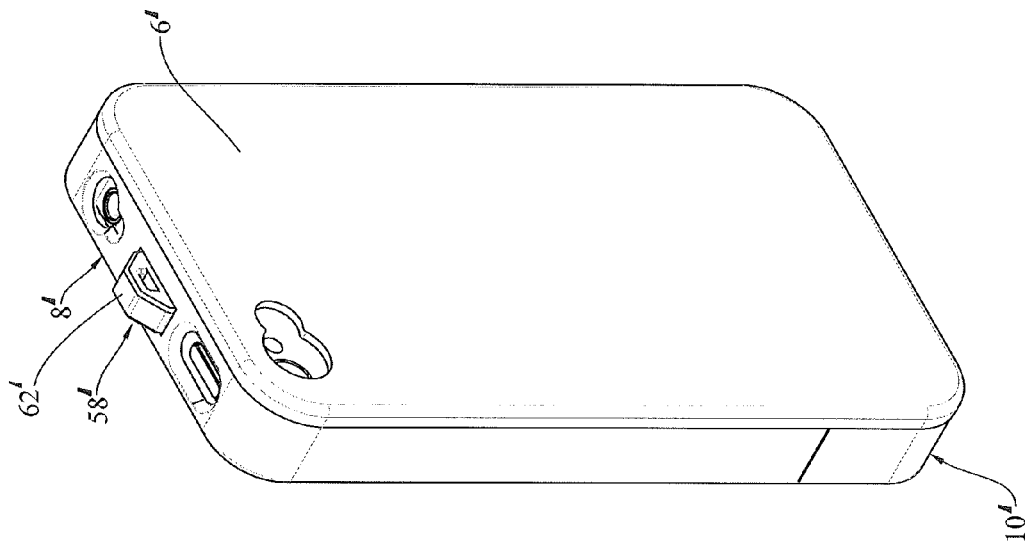
FIG. 9 is a rear perspective view of the case assembly in accordance with the second embodiment of the present invention.
Figure 8:
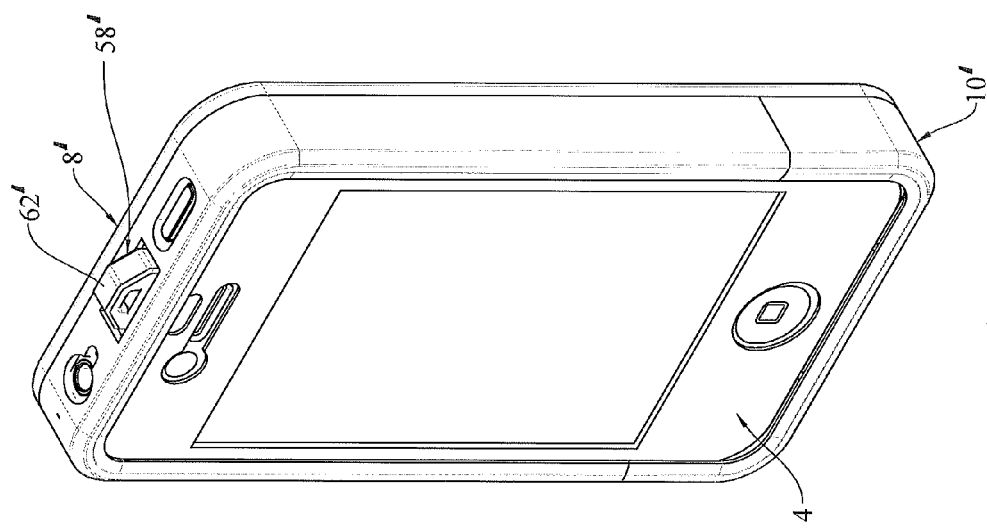
FIG. 8 is a front perspective view of a portable device with a case assembly in accordance with a second embodiment of the present invention.

The second sleeve member 10 is a generally rigid member that fits over a bottom portion of the portable device 2 and mates with the first sleeve member 8. The second sleeve member 10 will flex slightly according to its dimensions and material make-up. However, the second sleeve member 10 provides a rigid covering of the portable device 2. The second sleeve member 10 is generally made of acrylonitrile butadiene styrene, polycarbonate or poly-olefin resins, for example. As best shown in FIG. 4, the second sleeve member 10 includes a second receptacle channel 38 formed by a second perimeter wall 40 and flange walls 42, 44. The perimeter wall 40 abuts against a perimeter of the portable device 2. The flange walls 42, 44 are disposed approximately perpendicular to the perimeter wall 40 and are located on respective sides of the second perimeter wall 40. The second perimeter wall 40 and the flange walls 42, 44 are shaped to substantially follow contours present in the perimeter of the portable device 2. In this embodiment, the second perimeter wall 40 includes an elongated aperture or slot therein to receive a dock connector or jack, for example. As best shown in FIG. 3, the second sleeve member 10 has sheath portions 46, 48 at respective end portions of the receptacle channel 38. In this embodiment, the sheath portions 46, 48 have channels 50 recessed therein to receive the ribs 36 protruding from the insert portions 32, 34. The insert portions 32, 34 insert into respective sheath portions 46, 48 so as to mate the first sleeve member 8 with the second sleeve member 10. Upon insertion, the first receptacle channel 24 and the second receptacle channel 38 form a congruent channel that is configured to receive and hold the portable device 2. When mated, the first and second sleeve members 8 and 10 substantially mimic a one-piece unit. Thus, the flange wall 28 and the flange wall 42 are in substantially the same plane. Likewise, the flange wall 30 and the flange wall 44 are in substantially the same plane.

The second sleeve member 10 further includes a back wall 51. In this embodiment, the back wall 51 is integrally formed with flange wall 44 to form a one-piece, unitary backing. The back wall 51 can be a separate piece that is inserted into the first and/or second receptacle channels 24, 38.

Referring now to FIG. 1*a*, the second plate member or customized plate member 6 is a replaceable piece that is removably attached to the first and second sleeve members 8, 10. Specifically, a first receiving channel 52 is formed in the flange wall 30 and a second receiving channel (not shown) is formed in the flange wall 44 (not shown). The first receiving channel 52 and the second receiving channel are sized and configured to receive the ridge portion 20 in a press-fit connection, thereby securing the interior face of the second plate member 6 adjacent the exterior face of the second sleeve member 10. Thus, when assembled, the second plate member 6 locks the first sleeve member 8 and the second sleeve member 10 together. That is, the second plate member 6 prevents disassembly of the first and second sleeve members 8, 10. In operation, a user removes the second plate member 6 to remove the first and second sleeve members 8, 10 from the portable device 2.

Referring to FIGS. 4-7, and as best shown in FIG. 4, the first sleeve member 8 includes an accessory aperture 56 through the first perimeter wall 26 and located between corner portions of the perimeter wall 26. As best shown in FIG. 4, the case assembly 1 further includes an accessory member 58, a portion of which is sized and configured to fit through the accessory aperture 56. The accessory aperture 56 and the accessory member 58 provide an attachment structure for users to further individualize the case assembly 1 by attaching one or more accessories as desired. Examples of accessories that can be attached include lights, lanyards with carabineers or retractable clips, ornaments with snaps and/or handle straps, chains or fabric necklaces.

Figure 5:
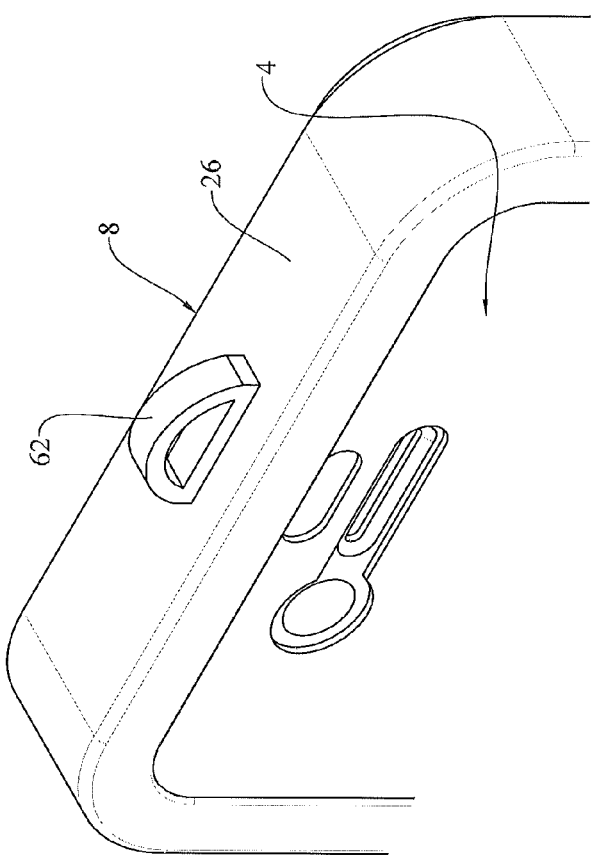
FIG. 5 is a magnified front perspective view of the first sleeve member of FIG. 1 and the accessory member of FIG. 4 secured on the portable device.

Referring now to FIGS. 4 and 5, an embodiment of the accessory member 58 that extends outwardly from the first sleeve member 8 when secured is illustrated. The accessory member 58 includes a base portion 60 and a head portion 62. In this embodiment, the base portion 60 is a flat, plate-like member that lies against a top surface of the portable device 2. The head portion 62, in this embodiment, is a curved bar that forms an arch above the base portion 60. The user may clip or snap accessories, such as ornaments or handles, around the head portion 62.

Referring to FIGS. 6 and 7, an optional embodiment of the accessory member 58 is illustrated. The base portion 60 is the same or substantially the same as that shown and described with reference to FIGS. 4 and 5. However, a head portion 63 is attached to the base portion 60 that is sized and configured to merely close the accessory aperture 56. Specifically, the head portion 63 is a plug-like member that extends from the base portion 60 into the accessory aperture 56. The head portion 63 has outer dimensions that are substantially the same as inner dimensions of the accessory aperture 56. That is, the head portion 63 is sized such that a top surface of the head portion 63 lies flush (or in approximately the same plane) with an exterior of the first perimeter wall 26 to plug the accessory aperture 56. The accessory aperture 56 is sized to be smaller than an area of the base portion 60. Accordingly, upon mating the first sleeve member 8 with the second sleeve member 10, the base portion 60, disposed between the first sleeve member 8 and the portable device 2, is trapped against the top surface of the portable device 2. Thus, the case assembly 1, along with the portable device 2, can be lifted by the accessory attached to the head portion 63 without pulling the base portion 60 through the accessory aperture 56.

Second Embodiment

Referring now to FIGS. 8-14, a case assembly in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a prime (').

Figure 11:
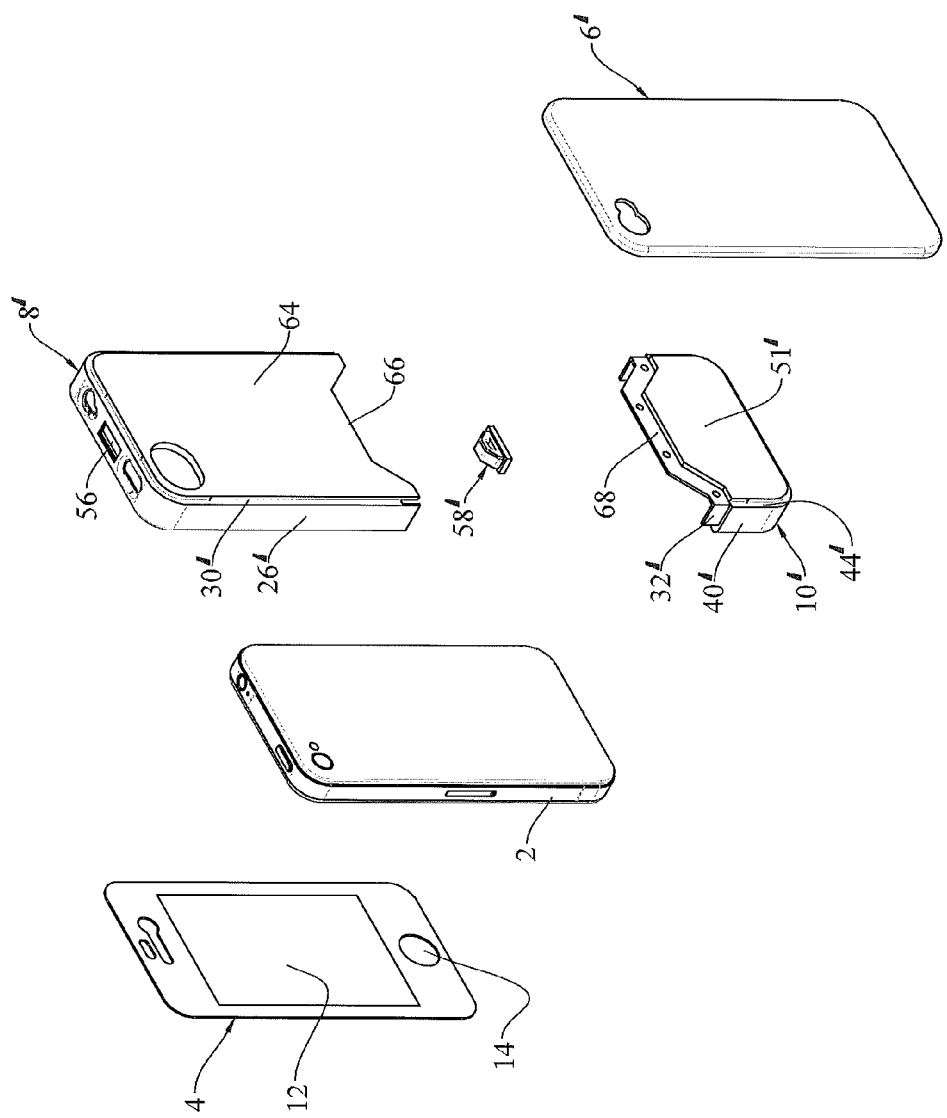
FIG. 11 is an exploded rear view of the case assembly in accordance with the second embodiment of the present invention.

As best shown in FIG. 10, the case assembly of the second embodiment includes a first sleeve member 8' for fitting over a top portion of the portable device 2 and a second sleeve member 10' for fitting over a bottom portion of the portable device 2. The first sleeve member 8' includes a first receptacle channel 24' formed by a perimeter wall 26' and flange walls 28', 30'. The flange walls 28', 30' are on respective sides of the perimeter wall 26', which abuts against a perimeter of the portable device 2. The perimeter wall 26' and the flange walls 28', 30' are shaped to substantially follow contours present in the perimeter of the portable device 2. The first sleeve member 8' has sheath portions 46', 48' at respective end portions of the receptacle channel 24'. As best shown in FIG. 11, the first sleeve member 8' further includes a first back wall 64 that, in this embodiment, is integrally formed with flange wall 30' to form a one-piece, unitary backing. As best shown in FIG. 10, the first back wall 64 has a sheath portion 66 at an end portion adjacent to and substantially perpendicular to the sheath portions 46', 48'. The first back wall 64 also has apertures for placement over a camera lens, for example. The first sleeve member 8' traps another embodiment of an accessory member 58' against the portable device 2 such that a head portion 62' extends through the accessory aperture 56.

As best shown in FIG. 10, the second sleeve member 10' includes a second receptacle channel 38' formed by a second perimeter wall 40' and flange walls 42', 44'. The flange walls 42', 44' are on respective sides of the second perimeter wall 40', which abuts against a perimeter of the portable device 2. The second perimeter wall 40' and the flange walls 42', 44' are shaped to substantially follow contours present in the perimeter of the portable device 2. In this embodiment, the second perimeter wall 40' includes an elongated aperture or slot therein to receive a dock connector or jack, for example. The second sleeve member 10' has insert portions 32', 34' at respective end portions of the receptacle channel 38'. The first sleeve member 8' further includes a second back wall 51' that, in this embodiment, is integrally formed with flange wall 44' to form a one-piece, unitary backing. The second back wall 51' has an insert portion 68 at an end portion adjacent to and substantially perpendicular to the insert portions 32', 34'.

As best shown in FIG. 10, the sheath portions 46', 48', 66 are recessed portions in the first sleeve member 8' configured to receive respective insert portions 32', 34', 68. The insert portions 32', 34', 68 are recessed portions located at end portions of the second sleeve member 10'. Referring to FIGS. 10 and 11, upon mating the insert portions 32', 34', 68 into the sheath portions 46', 48', 66, the interior and exterior faces of the second back wall 51' is in substantially the same plane as the interior and exterior faces of the first back wall 64.

Figure 13:
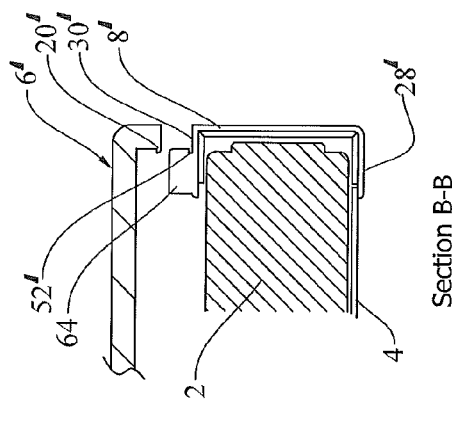
FIG. 13 is a partial cross-section and partial exploded view of the case assembly taken along line B-B in FIG. 12.
Figure 14:
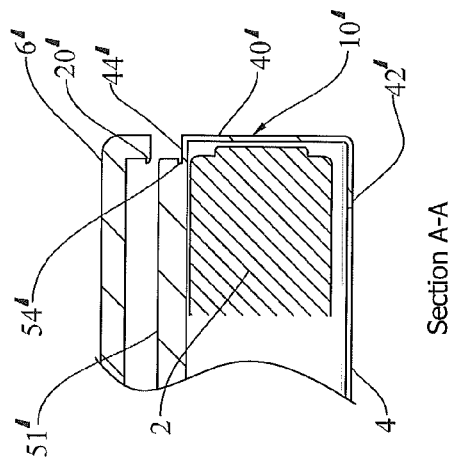
FIG. 14 is a partial cross-section and partial exploded view of the case assembly taken along line A-A in FIG. 12.
Figure 12:
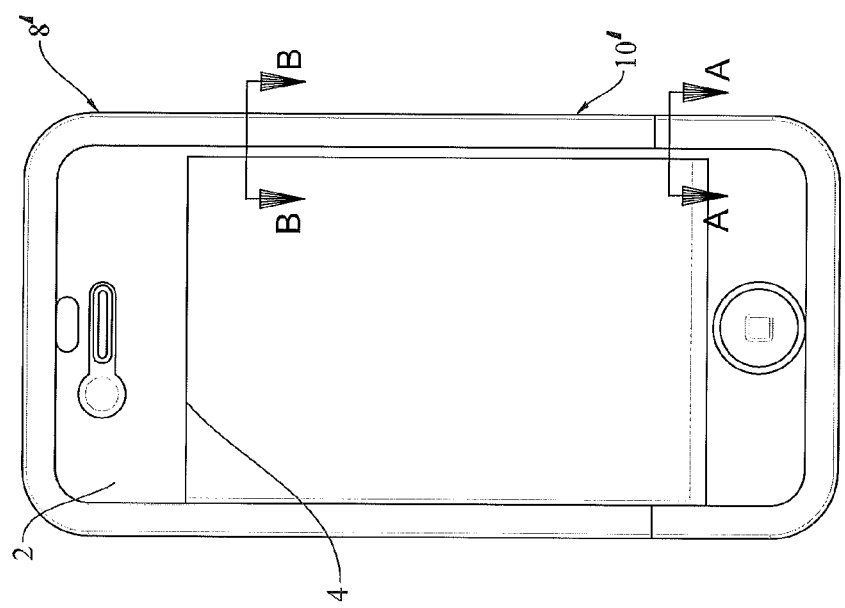
FIG. 12 is a front plan view of the case assembly in accordance with the second embodiment of the present invention.

Referring to FIGS. 12-14, the detachable second plate member 6' is shown as it is attached to the first and second sleeve members 8', 10'. As best shown in FIG. 13, the first back wall 64 includes a first receiving channel 52' and the second plate member 6' includes a rib portion 20' for insertion into the first receiving channel 52'. The rib portion 20' extends inwardly a periphery of the second plate member 6'. As best shown in FIG. 14, the rib portion 20' is also configured for insertion into a second receiving channel 54' disposed in the second back wall 51'. As best shown in FIG. 13, the first receiving channel 52' is recessed into the first back wall 64 and runs about a periphery of the first sleeve member 8'. As best shown in FIG. 14, the second receiving channel 54' is recessed into the second back wall 51' and extends about a periphery of the second sleeve member 10'. The rib portion 20' extends inwardly at a length sufficient to cause a friction fit. That is, when the rib portion 20' is being inserted into both the first and second receiving channels 52', 54' about the periphery of the first and second sleeve members 8', 10', the detachable second plate member 6' will snap into place over the first sleeve member 8' and the second sleeve members 10'. Thus, when assembled, the second plate member 6' locks the first sleeve member 8' and the second sleeve member 10' together. That is, the second plate member 6' prevents disassembly of the first and second sleeve members 8', 10'. In operation, a user removes the second plate member 6' to remove the first and second sleeve members 8', 10' from the portable device 2.

Referring to FIG. 15, a method 100 for covering a portable device 2 and customizing a detachable plate member is illustrated. At block 102, at least a portion of the portable device 2 is covered with a first sleeve member and a second sleeve member. The case assembly 1 of the present invention provides a covering that the user can customize. At block 104, the detachable plate member is customized with graphics on an exterior face. The detachable plate member allows the user of the case assembly 1 to swap detachable plate members. At block 106, the detachable plate member is attached to the first and second sleeve members. The case assembly 1 and method 100 provides graphics that the user can identify with on a detachable plate. The detachable plate can be swapped for another detachable plate, thereby allowing the user to change the graphics that are shown in connection with covering the user's portable device 2.

General Interpretation of Terms

In understanding the scope of the present invention, the term "comprising" and its derivatives, as used herein, are intended to be open ended terms that specify the presence of the stated features, elements, components, groups and/or steps, but do not exclude the presence of other unstated features, elements, components, groups and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

What is claimed is:

1. A case assembly for a portable device comprising:
a first plate member;
a second plate member having an interior surface and a ridge portion extending from the interior surface, the ridge portion being disposed about a periphery of the interior surface of the second plate member, the second plate member including graphics to individualize the portable device;
a first sleeve member having a first receptacle channel for the portable device with insert portions extending therefrom, the first plate member being disposed in the first receptacle channel, the first sleeve member being sized and configured to fit over the portable device and to curve about its perimeter; and
a second sleeve member having sheath portions configured to receive the insert portions, the second sleeve member being sized and configured to fit over the portable device and to curve about its perimeter, the second plate member being disposed adjacent to the second sleeve member.

2. The case assembly of claim 1, wherein
the second sleeve member has a second receptacle channel for the portable device with the first plate member being disposed in the second receptacle channel.

3. The case assembly of claim 1, wherein
the second sleeve member has a back wall adjacent the second plate member.

4. The case assembly of claim 1 wherein
the second plate member locks the first sleeve member together with the second sleeve member.

5. A case assembly for a portable device comprising:
a first plate member;
a second plate member having an interior surface and a ridge portion extending from the interior surface, the ridge portion being disposed about a periphery of the interior surface of the second plate member, the second plate member including graphics to individualize the portable device;
a first sleeve member having a first receptacle channel with insert portions extending therefrom, the first sleeve member having a receiving channel to receive the ridge portion of the second plate member with a press-fit connection, the first sleeve member being sized and configured to fit over the portable device and to curve about its perimeter; and
a second sleeve member having sheath portions configured to receive the insert portions, the second sleeve member having a receiving channel to receive the ridge portion of the second plate member with a press-fit connection, the second sleeve member being sized and configured to fit over the portable device and to curve about its perimeter, the second plate member being disposed adjacent to the second sleeve member.

6. The case assembly of claim 5, wherein
the second sleeve member has a back wall adjacent the second plate member.

7. The case assembly of claim 5, wherein
the second plate member locks the first sleeve member together with the second sleeve member.

8. A method for covering a portable device comprising:
covering at least a portion of a portable device with a first sleeve member, the first sleeve member having a first receptacle channel for the portable device with insert portions extending therefrom the first sleeve member being sized and configured to fit over the portable device and to curve about its perimeter;
covering at least a portion of the portable device with a second sleeve member, the second sleeve member having sheath portions configured to receive the insert portions, the second sleeve member being sized and configured to fit over the portable device and to curve about its perimeter;
attaching a detachable first plate member to the first and second sleeve members, the first plate member being disposed in the first receptacle;
customizing a detachable second plate member with graphics, the second plate member having an interior surface and a ridge portion extending from the interior surface, the ridge portion being disposed about a periphery of the interior surface of the second plate member; and
attaching the detachable second plate member to the first and second sleeve members to lock the first and second sleeve members together.

9. The method of claim 8, further comprising
trapping an accessory member between the first sleeve member and the portable device by attaching the first sleeve member to the second sleeve member.

10. The method of claim 9, further comprising attaching a detachable accessory to the accessory member.

11. The method of claim 8, further comprising
detaching the detachable plate member and attaching a different detachable plate member to the first and second sleeve members.

12. A method for covering a portable device with a detachable first plate member and a detachable second plate member comprising:
covering at least a portion of a portable device with a first sleeve member, the first sleeve member having a first receptacle channel with insert portions extending therefrom, the first sleeve member having a receiving channel to receive a ridge portion of the detachable second plate member with a press-fit connection, the first sleeve member being sized and configured to fit over the portable device and to curve about its perimeter;
covering at least a portion of the portable device with a second sleeve member, the second sleeve member having sheath portions configured to receive the insert portions, the second sleeve member having a receiving channel to receive the ridge portion of the detachable second plate member with a press-fit connection, the second sleeve member being sized and configured to fit over the portable device and to curve about its perimeter;
attaching the detachable first plate member to the first and second sleeve members;
customizing the detachable the second plate member with graphics, the second plate member having an interior surface and the ridge portion extending from the interior surface, the ridge portion being disposed about a periphery of the interior surface of the second plate member; and
attaching the detachable second plate member to the first and second sleeve members to lock the first and second sleeve members together.

* * * * *